UNITED STATES PATENT OFFICE 2,623,035

ADDITION PRODUCTS OF AN AMINE AND SULFONE-ACTIVATED ETHYLENIC COMPOUNDS

Joseph W. Schappel, Morton, Pa., assignor to American Viscose Corporation, Wilmington, Del., a corporation of Delaware No Drawing. Application August 2, 1950, Serial No. 177,344

15 Claims. (Cl. 260—77.5)

This invention relates to a new and useful class of compounds formed by the addition of an amine to a sulfone-activated ethylenic compound, i. e., compounds having ethylenic (C=C) linkages which are activated by a sulfone (—SO$_2$—) group adjacent said ethylenic linkages. More particularly, the invention relates to monomeric and polymeric addition products of urea with sulfone-activated ethylenic compounds. The invention further relates to a method for the preparation of the new compounds.

The compounds of this invention, as far as is known, have never been described or suggested in the prior art. These compounds have varied and interesting properties which make them suitable for a wide variety of uses. For example, the monomeric products of the invention are useful for application to textile materials, such as natural and artificial fibers, filaments, yarns, fabrics, and the like. At higher degrees of polymerization, the polymeric addition products of the present invention may be used for the production of fibers, films, coating materials, molded articles, etc. The polymeric addition products of low degrees of polymerization, which generally are viscous liquids or low melting solids, are useful as lubricants, plasticizers, rubber substitutes, and the like.

It is an object of the present invention to provide a new and useful class of chemical compounds having the above and additional advantageous properties.

Another object of the invention is to provide new and useful monomeric and polymeric addition products of an amine and sulfone-activated ethylenic compounds.

Another object of the invention is to provide a method for the preparation of the new compounds.

Other objects and advantages of the present invention will be obvious from the description thereof hereinafter.

The objects of the present invention are accomplished by reacting and/or condensing urea, the donor, since it is the molecule supplying the active hydrogen, with a sulfone-activated ethylenic compound, which is referred to as the acceptor. Particularly, the monomers and polymers of the present invention are formed by the interaction of urea with compounds containing two vinyl groups, or substituted vinyl groups, adjacent to a sulfone group.

The polymers are formed by employing substantially stoichiometric equivalents of the donor and acceptor. Addition usually occurs by hydrogen adding to the carbon alpha to sulfone group, although it is possible that some of the hydrogen addition takes place on the beta carbon atom. In either case a polymer is formed having a high molecular weight. When using an excess of urea, the molecular weight drops causing viscous liquids to low melting solids to be formed.

The reaction may be controlled to have addition of the acceptor molecule on either or both of the amine groups of urea. This type of reaction product is represented by the general formula:

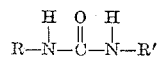

where R represents the radical derived from the acceptor molecule and R' may be either the same as R or hydrogen.

In the case of the polymers, it is believed that the addition product has the general formula:

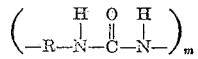

where R is a radical derived from an acceptor molecule containing two vinyl or substituted vinyl groups adjacent to a sulfone group, and $m$ is an integer of variable value according to the degree of polymerization.

As examples of suitable acceptor compounds for the practice of the present invention, there are the monomeric sulfonyl chemicals having from one to two intermediate sulfonyl radicals, each linked to a terminal vinyl group or a substituted vinyl group. The following list is illustrative of such acceptor compounds.

Di-vinyl sulfone (vinyl sulfone)

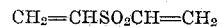

Isopropenyl sulfone

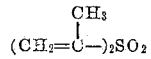

Propenyl sulfone

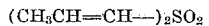

1,2-bis (vinyl sulfonyl) ethane

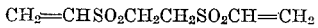

1,4-bis (vinyl sulfonyl) butane

Bis (vinyl sulfonyl) methane

Styryl sulfone

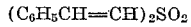

Alpha-ethyl vinyl sulfone

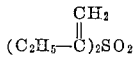

Alpha-n-propyl vinyl sulfone

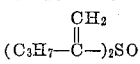

1-butenyl sulfone

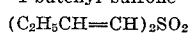

Alpha-phenyl vinyl sulfone

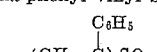

Bis (beta,beta'-vinyl sulfonyl)ethyl ether

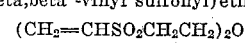

The polymerization is carried out by mixing a catalyst with the active hydrogen compound (urea) and then adding the acceptor. This addition should be done slowly since the reaction is frequently exothermic. When the addition is complete, the reaction mixture is heated to complete the reaction. If desired, an inert solvent may be employed, such as water, benzene, toluene, ethylene dichloride, and the like. It should be noted that while water will react with the acceptor compound, such as divinyl sulfone, it is still suitable as a solvent since its rate of reaction is much slower than that of urea.

Suitable catalysts for the polymerization reaction are any base or alkali which is unreactive with the sulfones or acceptors. For example, there may be employed quaternary ammonium hydroxides, the alkali and alkaline earth metals, their oxides, hydrides, and carbonates, such as sodium hydroxide, sodium ethoxide, sodium hydride, phenyl lithium, potassium carbonate, metallic sodium, barium, calcium, etc., trimethyl benzyl ammonium hydroxide, tetramethyl ammonium hydroxide, and the like, etc. The amount of the catalyst necessary for the reaction is small, e. g. .001–1% or more.

Normally polymerization proceeds rapidly at room temperature and requires external cooling. However, satisfactory polymerizations are obtained at temperatures varying from 0° C. to about 200° C. Higher temperatures would be limited only by the stability of the reactants. Lower temperatures may be employed but the reaction time is thereby increased.

Usually polymerization is allowed to proceed until it has substantially exhausted itself. However, the reaction may be terminated by the addition of an acid.

In order to illustrate the invention but not to limit the same thereby, the following examples are given.

Example I

Two moles of di-vinyl sulfone are reacted with one mol of urea by adding the divinyl sulfone very slowly to a 25% aqueous solution of urea containing 0.375 to 0.625% sodium hydroxide, based on the weight of the solution. The reaction temperature was maintained at 20° C. for approximately 30 minutes. The resultant N,N'-bis-beta-vinyl sulfonyl ethyl urea is soluble in water and stable aqueous solutions of the same may be formed containing up to 8% of the compound.

Example II

The procedure of Example I was followed using propenyl sulfone. Again the product was a solid substance also soluble in water.

Example III

One mol of divinyl sulfone was reacted with one mol of urea by adding the divinyl sulfone to a 50% aqueous solution of urea containing 0.25% sodium hydroxide while maintaining the temperature at 18–20° C. for 30 minutes. The compound obtained forms stable aqueous solutions up to 5% concentration.

Example IV

The compound of Example III was dissolved in water to give a solution of approximately 3–5%. 0.10% NaOH was added and the temperature maintained at 20° C. for 15 minutes. The resultant product was a resinous solid having a higher degree of polymerization than the product of Example III.

Example V

The same procedures of Examples III and IV were followed except that one mol of isopropenyl sulfone was employed. A solid product was obtained.

Example VI

One mol of divinyl sulfone was reacted with one mol of urea by refluxing under 760 mm. pressure for 1 hour. The resulting polymer was a viscous compound having a higher degree of polymerization than the products of the previous examples. Refluxing may be continued for 2 hours or even 3 hours if desired.

In the case of all the reactions in the above examples and other reactions within the scope of the present invention, the reaction time, as well as the temperature, controls the degree of polymerization. At higher temperatures resins or polymers having a high degree of polymerization are obtained.

The polymers produced using lower reaction times and temperatures are more reactive than those produced at higher temperatures for longer reaction periods. The polymers of the present invention may be dissolved in water and catalyzed with sodium hydroxide or any of the other herein named catalysts. Such catalyzed solutions are stable for periods of 30 minutes to one hour. Hence, the catalysts should not be added to such solutions until just prior to use.

Further, the polymers may be further condensed by dissolving in a suitable solvent and heating at elevated temperatures for additional periods of time over and above that of the original reaction period. Heating at elevated temperatures produces hard solid resins.

It is to be understood that changes and variations may be made without departing from the spirit and scope of the invention as defined in the appended claims.

I claim:

1. An addition product of one mol of urea and one to two mols of a monomeric sulfonyl compound having from one to two intermediate sulfonyl radicals, each of said radicals being linked to a terminal group selected from the class consisting of vinyl and mono-hydrocarbon-substituted vinyl.

2. An addition product of urea and divinyl sulfone having the formula

$(CH_2=CHSO_2CH_2CH_2NH)_2C=O$

3. An addition product of urea and propenyl sulfone having the formula

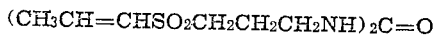
$(CH_3CH=CHSO_2CH_2CH_2CH_2NH)_2C=O$

4. An addition product of urea and isopropenyl sulfone having the formula

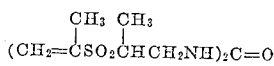
$$(CH_2=\overset{CH_3}{\underset{|}{C}}SO_2\overset{CH_3}{\underset{|}{C}}HCH_2NH)_2C=O$$

5. An addition product of urea and 1,2-bis (vinyl sulfonyl) ethane having the formula

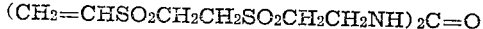
$(CH_2=CHSO_2CH_2CH_2SO_2CH_2CH_2NH)_2C=O$

6. An addition product of urea and 1,4-bis (vinyl sulfonyl) butane having the formula

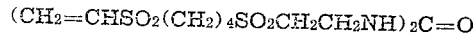
$(CH_2=CHSO_2(CH_2)_4SO_2CH_2CH_2NH)_2C=O$

7. As a composition of matter, a polymeric addition product of urea and divinyl sulfone.

8. As a composition of matter, a polymeric addition product of urea and propenyl sulfone.

9. As a composition of matter, a polymeric addition product of urea and isopropenyl sulfone.

10. As a composition of matter, a polymeric addition product of urea and 1,2-bis (vinyl sulfonyl) ethane.

11. As a composition of matter, a polymeric addition product of urea and 1,4-bis (vinyl sulfonyl) butane.

12. A process as defined in claim 15 wherein the alkaline medium comprises an aqueous sodium hydroxide solution.

13. A process comprising adding one mol of divinyl sulfone to a 50% aqueous solution of urea containing one mol of the same, said solution containing 0.25% sodium hydroxide, while maintaining the temperature at 18–20° C. for a period of 30 minutes.

14. As a composition of matter, a polymeric addition product of urea and a monomeric sulfonyl compound having from one to two intermediate sulfonyl radicals, each of said radicals being linked to a terminal group selected from the class consisting of vinyl and mono-hydrocarbon-substituted vinyl, said sulfonyl compound being linked to the N of urea through the said terminal group.

15. A process comprising the step of reacting urea with a monomeric sulfonyl compound having from one to two intermediate sulfonyl radicals, each of said radicals being linked to a terminal group selected from a class consisting of vinyl and mono-hydrocarbon-substituted vinyl in an alkaline medium for 15 to 180 minutes at 0° to 200° C. in the ratio of 1 mol of urea to 1 to 2 mols of the monomeric sulfonyl compound.

JOSEPH W. SCHAPPEL.

REFERENCES CITED

The following references are of record in the file of this patent:

UNITED STATES PATENTS

| Number | Name | Date |
|---|---|---|
| 2,390,253 | Henke | Dec. 4, 1945 |

FOREIGN PATENTS

| Number | Country | Date |
|---|---|---|
| 865,455 | France | Feb. 24, 1941 |